United States Patent
Ramakrishna et al.

(10) Patent No.: US 7,869,416 B2
(45) Date of Patent: Jan. 11, 2011

(54) METHOD FOR ENABLING USE OF SECONDARY PILOT SIGNALS ACROSS A FORWARD LINK OF A CDMA NETWORK EMPLOYING A SLOTTED TRANSMISSION SCHEME AND TIME MULTIPLEXED PILOT CHANNEL

(75) Inventors: Sudhir Ramakrishna, New York, NY (US); Ashok N. Rudrapatna, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 985 days.

(21) Appl. No.: 11/070,437

(22) Filed: Mar. 2, 2005

(65) Prior Publication Data

US 2006/0199577 A1   Sep. 7, 2006

(51) Int. Cl.
*H04J 3/00* (2006.01)
*H04B 7/216* (2006.01)

(52) U.S. Cl. .................. 370/345; 370/335; 370/336

(58) Field of Classification Search .............. 455/67.11, 455/562.1; 370/345, 334, 343, 335, 442, 370/330, 328, 332, 336, 342
See application file for complete search history.

(56) References Cited

U.S. PATENT DOCUMENTS

| | | | | |
|---|---|---|---|---|
| 6,731,619 B1 * | 5/2004 | Ramesh et al. | ............... | 370/334 |
| 6,952,455 B1 * | 10/2005 | Banister | ..................... | 375/267 |
| 6,965,633 B2 * | 11/2005 | Sun et al. | ..................... | 375/145 |
| 7,035,659 B1 * | 4/2006 | Yang | ......................... | 455/522 |
| 7,203,519 B2 * | 4/2007 | Ylitalo | .................... | 455/562.1 |
| 7,218,948 B2 * | 5/2007 | Laroia et al. | ................. | 455/522 |
| 7,313,167 B2 * | 12/2007 | Yoon et al. | ................... | 375/148 |
| 7,346,034 B2 * | 3/2008 | Takano et al. | ............... | 370/331 |
| 7,352,829 B2 * | 4/2008 | Jalloul et al. | ................ | 375/340 |
| 7,433,339 B2 * | 10/2008 | Kaipainen et al. | .......... | 370/335 |
| 2001/0031647 A1 * | 10/2001 | Scherzer et al. | ............. | 455/562 |
| 2002/0012334 A1 * | 1/2002 | Strawczynski et al. | ...... | 370/337 |
| 2002/0105961 A1 * | 8/2002 | Hottinen et al. | ............. | 370/442 |
| 2003/0148770 A1 * | 8/2003 | Das et al. | ..................... | 455/455 |
| 2004/0132494 A1 * | 7/2004 | Tirkkonen et al. | ........ | 455/562.1 |
| 2004/0160921 A1 * | 8/2004 | Kaipainen et al. | ........... | 370/335 |
| 2004/0233872 A1 * | 11/2004 | Lobinger et al. | ............ | 370/334 |
| 2005/0030886 A1 * | 2/2005 | Wu et al. | ..................... | 370/206 |
| 2005/0070285 A1 * | 3/2005 | Goransson | .................. | 455/436 |
| 2005/0208959 A1 * | 9/2005 | Chen et al. | ................... | 455/515 |
| 2006/0002361 A1 * | 1/2006 | Webster et al. | .............. | 370/343 |

(Continued)

*Primary Examiner*—George Eng
*Assistant Examiner*—Brandon J Miller
(74) *Attorney, Agent, or Firm*—David M. LaBruno

(57) ABSTRACT

A method enables the use of a secondary pilot signal and a secondary antenna(s) in the forward link of a CDMA-based cellular network employing a slotted transmission scheme with a time-multiplexed primary pilot signal, with backwards compatibility. The forward link is divided into a number of time slots. For communications with "legacy" mobile stations that expect transmissions from a single, primary antenna (and that expect a single, primary pilot signal), during some of the time slots, only the primary antenna is used for transmissions, including transmitting the primary pilot signal. Neither the secondary pilot channel nor any other signals from the secondary antenna are transmitted. During the remaining time slots: (i) the primary pilot signal is transmitted from the primary antenna, and the secondary pilot signal is transmitted from the secondary antenna, but at different times; and (ii) data meant for the legacy mobile stations is not transmitted.

20 Claims, 3 Drawing Sheets

U.S. PATENT DOCUMENTS

| | | | |
|---|---|---|---|
| 2006/0009168 A1* | 1/2006 | Khan et al. | 455/101 |
| 2006/0045192 A1* | 3/2006 | Hayashi | 375/260 |
| 2006/0114826 A1* | 6/2006 | Brommer | 370/230 |
| 2007/0230324 A1* | 10/2007 | Li et al. | 370/204 |

* cited by examiner

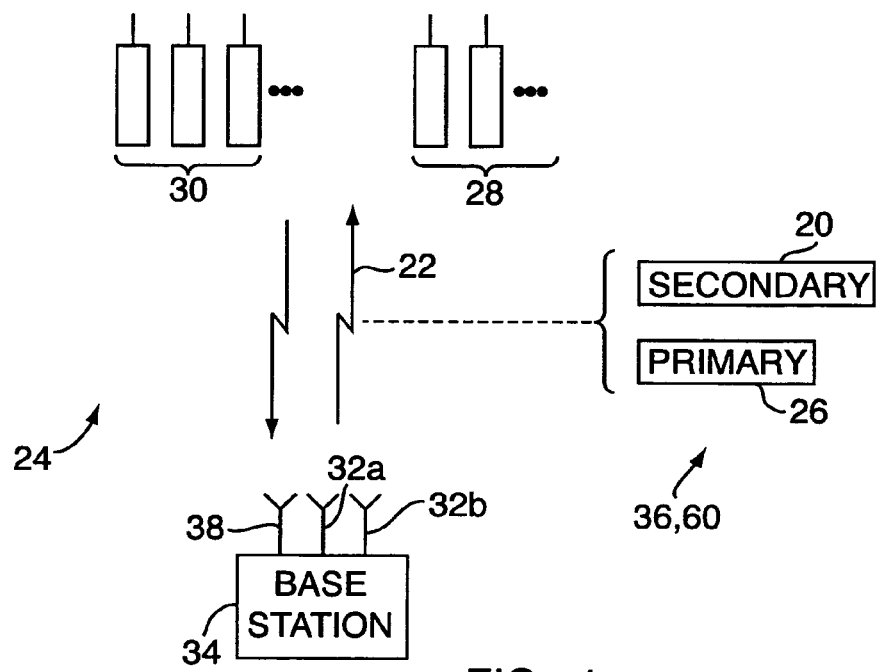
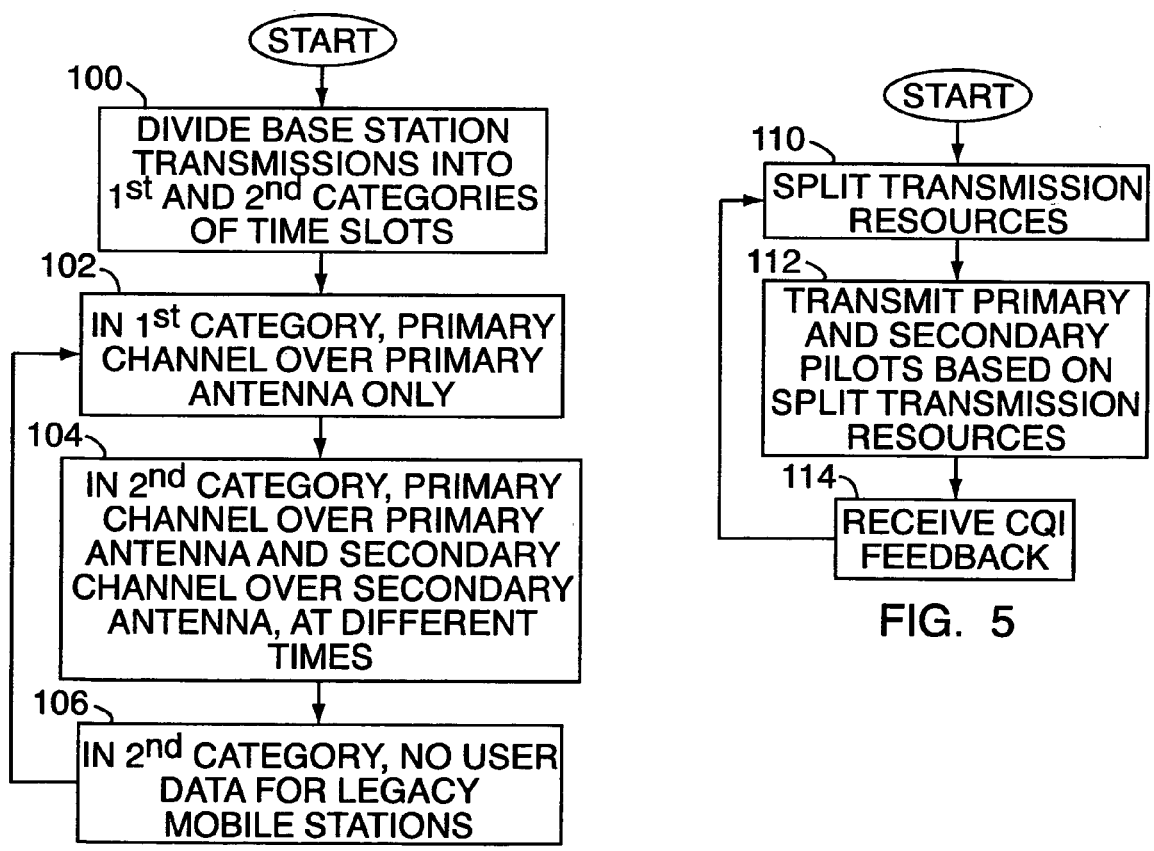

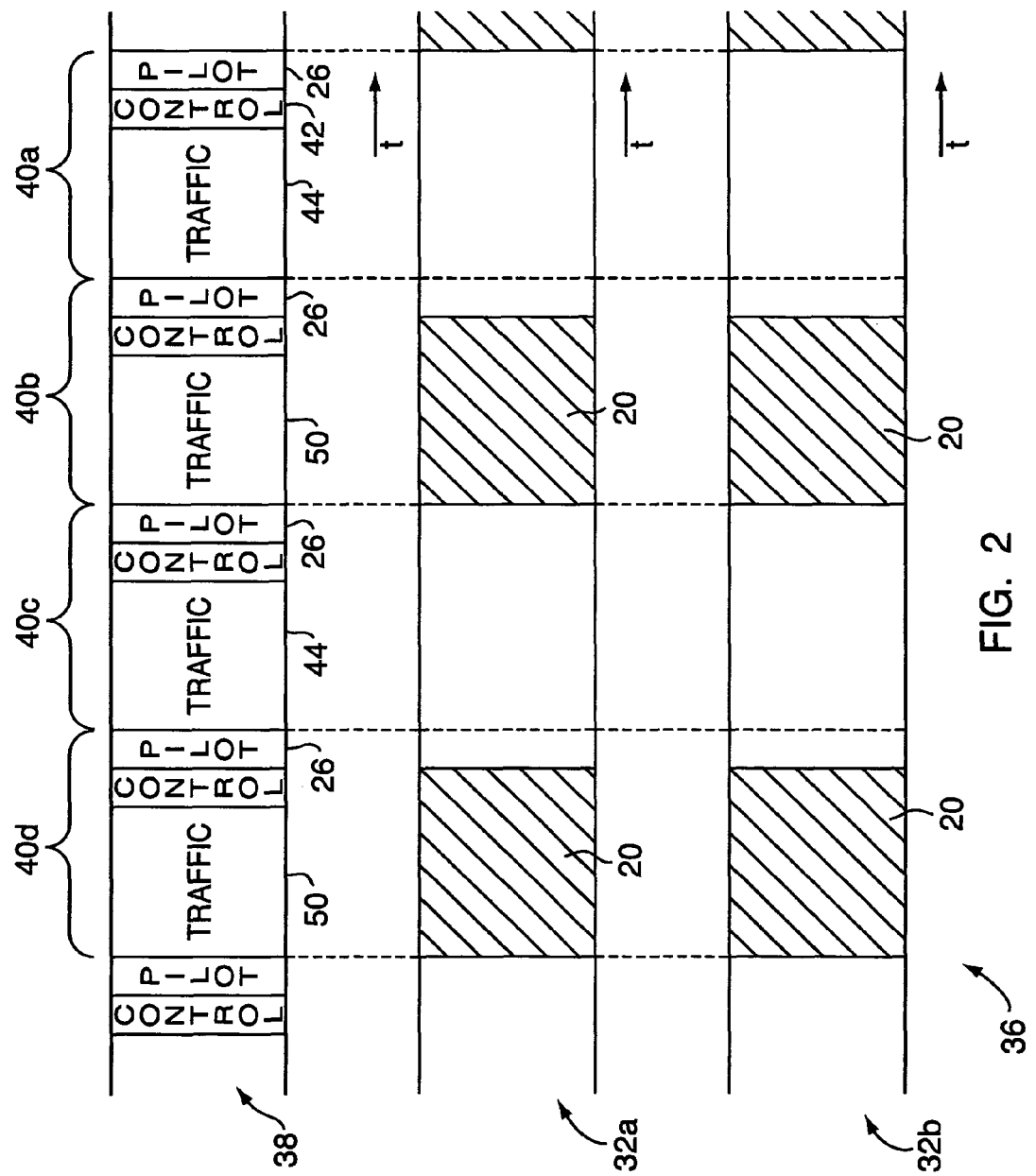

METHOD FOR ENABLING USE OF SECONDARY PILOT SIGNALS ACROSS A FORWARD LINK OF A CDMA NETWORK EMPLOYING A SLOTTED TRANSMISSION SCHEME AND TIME MULTIPLEXED PILOT CHANNEL

FIELD OF THE INVENTION

The present invention relates to telecommunications and, more particularly, to wireless communications systems.

BACKGROUND OF THE INVENTION

A typical cellular communications network is geographically divided into a number of cells and/or sectors, which are usually contiguous and which together define the coverage area of the network. Each cell is served by a base station, which includes a fixed/stationary transceiver and an antenna for wireless communications with a set of distributed mobile stations (e.g., mobile phones) that provide service to the network's users. The base stations are in turn connected to one or more mobile switching centers, each of which serves a particular number of base stations depending on network capacity and configuration. The mobile switching centers act as the interface between the wireless/radio end of the cellular network and a public switched telephone network or other network(s), including performing the signaling functions necessary to establish calls or other data transfer to and from the mobile stations.

In a cellular network, transmissions between the base and mobile stations may be carried out according to a number of possible protocols. In networks that utilize CDMA (code division multiple access) spread-spectrum communications, the mobile stations all transmit across the same frequency bandwidth, with the signals from each mobile station being differentiated from the others according to an encoding scheme. Transmissions from the base station to the mobile stations are across a frequency bandwidth known as a forward link, and communications between the mobile stations and base station are across a frequency bandwidth known as a reverse link. The forward link may include one or more logical channels for transmitting control signals and data/voice traffic. It may also include a pilot channel for transmitting a pilot signal, which is a signal whose characteristics are known to the mobile station receivers, for synchronization, handoff, and other purposes.

One type of CDMA implementation utilizes a slotted transmission scheme with a time-multiplexed pilot signal. In such a system, a single base station antenna is used for transmissions between the base station and mobile stations, with information on the forward link being transmitted in a time-slotted fashion, i.e., transmissions over the forward link are divided into time slots. In particular, each time slot is divided into portions over which a pilot signal (i.e., pilot channel), control information, and user data are transmitted in non-overlapping time zones, respectively. The time structure of the slot is known and synchronized between the base station transmitter and the mobile station receiver. Again, the pilot signal is a signal whose characteristics are known to the mobile receiver, and on which signal quality and channel estimation measurements may be made. Also, this pilot signal structure, where a portion of the time slot is allocated to pilot transmission, is referred to as a time-multiplexed pilot channel.

Signal quality measurements are made by the mobile station receiver and reported back to the base station in the form of channel quality indicator ("CQI") feedback. The base station may then utilize the CQI to determine the mode of transmissions to a particular mobile, e.g., the data rate to use to transmit to a particular mobile.

To such a system, one or more spatially separated transmit antennas may be added to the base station, in addition to the existing antenna. These antennas are used to transmit additional pilot signals, which are referred to as "secondary" pilot signals to differentiate them from the primary pilot signal transmitted inside the time slot by the primary antenna. The secondary pilot signals are differently configured from the primary pilot signal, allowing the mobile stations to distinguish between the two. The secondary pilot signals may be transmitted one per transmit antenna, or one per transmit beam. A transmit beam refers to a signal formed by the composition of coordinated transmissions from several transmit antennas. Accordingly, as used herein, the "transmit antenna" includes a "transmitted beam."

The secondary pilot signals can be either a broadcast pilot, i.e., targeted for and intended for all or a subset of the mobiles stations in a served area (e.g., sector or cell), or a "user specific" pilot intended for one specific mobile station.

Multiple antennas and secondary pilot signals are used to enhance system performance. In particular, due to several well-understood physical phenomena that impact the propagation of radio signals, because of the physical separation between the transmitting antennas, identical signals transmitted from two antennas at the same time lead to received signals of unequal quality at the mobile receiver. This phenomenon can be exploited, and there are many multiple antenna transmission schemes that offer superior performance. Examples include selection transmit diversity (e.g., transmitting to mobile stations from only one or a subset of antennas or beams), transmit diversity (e.g., transmitting a space-time coded signal from multiple transmit antennas), closed-loop transmit diversity (e.g., one or more beam-forming signals from multiple antennas to achieve increased signal gain at the receiver), MIMO-Code reuse (e.g., transmitting multiple data streams simultaneously to increase data rates), and fixed beam with beam switching. For enabling these multi-antenna transmission schemes, the base station needs to have a knowledge of the perceived received channel conditions across the transmit antennas. Since the primary and secondary pilot signals are transmitted from different antennas, knowledge of the channel quality measurements on these channels would imply a knowledge of channel conditions across the transmit antennas. Hence, for enabling these multiple antenna transmission schemes, the mobile stations need to make separate measurements on the primary and secondary pilot channels/signals, which are used for signal reception and/or to report required metrics back to the base station.

Because multiple antennas (along with associated secondary pilot signals, etc.) offer the opportunity for improving system performance, it may be advantageous in certain situations to outfit existing single-antenna systems with one or more additional transmit antennas. However, this raises issues of backwards compatibility, since existing mobile stations may not function properly when presented with signals from multiple antennas, e.g., multiple pilot signals.

SUMMARY OF THE INVENTION

In a CDMA-based cellular network, a stationary base station communicates wirelessly with a plurality of mobile stations across a forward link. The base station includes a primary antenna for transmitting a primary pilot signal, which is used by the mobile stations for synchronization, handoff, and other purposes. The base station also includes one or more secondary antennas for transmitting a secondary pilot signal/ channel. Using multiple transmit antennas allows the base station to take advantage of one or more transmission schemes that improve forward link performance over single transmit-antenna systems.

Because certain of the mobile stations are only compatible with a single antenna/single pilot signal system ("legacy" mobile stations), the addition of a secondary pilot channel requires that various conditions be met for backwards compatibility. Backwards compatibility may be implemented in a "strict" manner or a "loose" manner.

For "strict" backward compatibility, according to one embodiment of the present invention, the legacy mobile stations should not be disturbed in any way by the transmission of the secondary pilot signal. Specifically, since the legacy mobile stations make measurements on the primary pilot signal, no secondary channel transmissions should occur during the time the primary pilot channel is transmitted. Additionally, no secondary channel transmissions should occur during the time user data meant for the legacy mobile stations is transmitted.

To enable the use of a secondary pilot channel and a secondary antenna(s), while meeting strict backwards compatibility restraints, transmissions across the forward link are carried out according to a time-slotted transmission structure, which isolates the legacy mobile stations from any "new" or "secondary" mobile stations. Note that by "new" or "secondary" mobile station, it is meant a mobile station that is aware of the presence of the secondary pilot signal/channel, and that can take advantage of multiple antenna transmissions from the base station. In the transmission structure, the forward link is divided into a number of time slots, a portion of which are designated as "legacy" time slots. During the legacy time slots, only the primary antenna is used for forward link transmissions by the base station, including transmitting the primary pilot channel. Neither the secondary pilot channel nor any other signals from the secondary antennas are transmitted.

During the remaining, "new" or "secondary" time slots, the primary pilot signal is transmitted from the primary antenna, and the secondary pilot channel/signal is transmitted from the secondary antenna. However, for backwards compatibility, the primary and secondary pilot signals are transmitted at different times within the new time slots. Additionally, user data meant for the legacy mobile stations is not transmitted during the new time slots.

As should be appreciated, the above-described transmission structure/scheme enables the use of a secondary pilot signal on the multi transmit-antenna forward link of a CDMA network employing a slotted transmission scheme with a time-multiplexed primary pilot signal, with strict backwards compatibility. For legacy mobile stations, the system remains unchanged. For the system as seen by the new mobile stations, the transmission of the secondary pilot signal from the secondary antenna allows the base station, aided by mobile station measurements and reports, to transmit via multiple antennas/beams, thus improving overall system performance.

According to an additional embodiment of the present invention that exhibits loose backwards compatibility, the primary and secondary pilot channels are transmitted in a time overlapping manner. However, the performance of the legacy mobile stations is not impacted in a significantly adverse way by the transmission of the secondary pilot channel. Specifically, as implemented herein, transmitting the secondary pilot channel(s) does not significantly disturb the ability of the legacy mobile stations to detect and make measurements on the primary pilot signal.

To elaborate, for loose backwards compatibility, the time slot structure of the forward link is kept generally the same as that that of the legacy forward link. User data meant for either the legacy mobile stations or the new mobile stations may be transmitted in the time slots. In each of the time slots, the transmission resources (e.g., transmit power and/or codes) that were allocated solely to the primary pilot channel in the legacy system are now split between the primary and secondary pilot channels. Also, the secondary pilot channel(s) is transmitted from the secondary antenna(s) so as to overlap wholly or partially in time with respect to the primary pilot channel. However, the transmission resources (e.g., transmit power and/or codes) for the primary pilot channel are not reduced to such an extent as would affect the ability of the legacy (and other) mobile stations to receive the primary pilot channel and make signal quality measurements on it. The new mobile stations, being aware of the presence of the secondary pilot channel(s) and of the reduction in primary pilot channel transmit resources, may process these pilot signals accordingly.

BRIEF DESCRIPTION OF THE DRAWINGS

The present invention will be better understood from reading the following description of non-limiting embodiments, with reference to the attached drawings, wherein below:

FIG. 1 is a schematic diagram of a portion of a cellular communications network according to an embodiment of the present invention;

FIG. 2 is a schematic timing diagram of a forward link time-slotted transmission structure supporting strict backwards compatibility;

FIG. 3 is a flowchart illustrating a communications method supporting strict backwards compatibility;

FIG. 5 is a flowchart illustrating a communications method supporting loose backwards compatibility.

DETAILED DESCRIPTION

Figure 4:
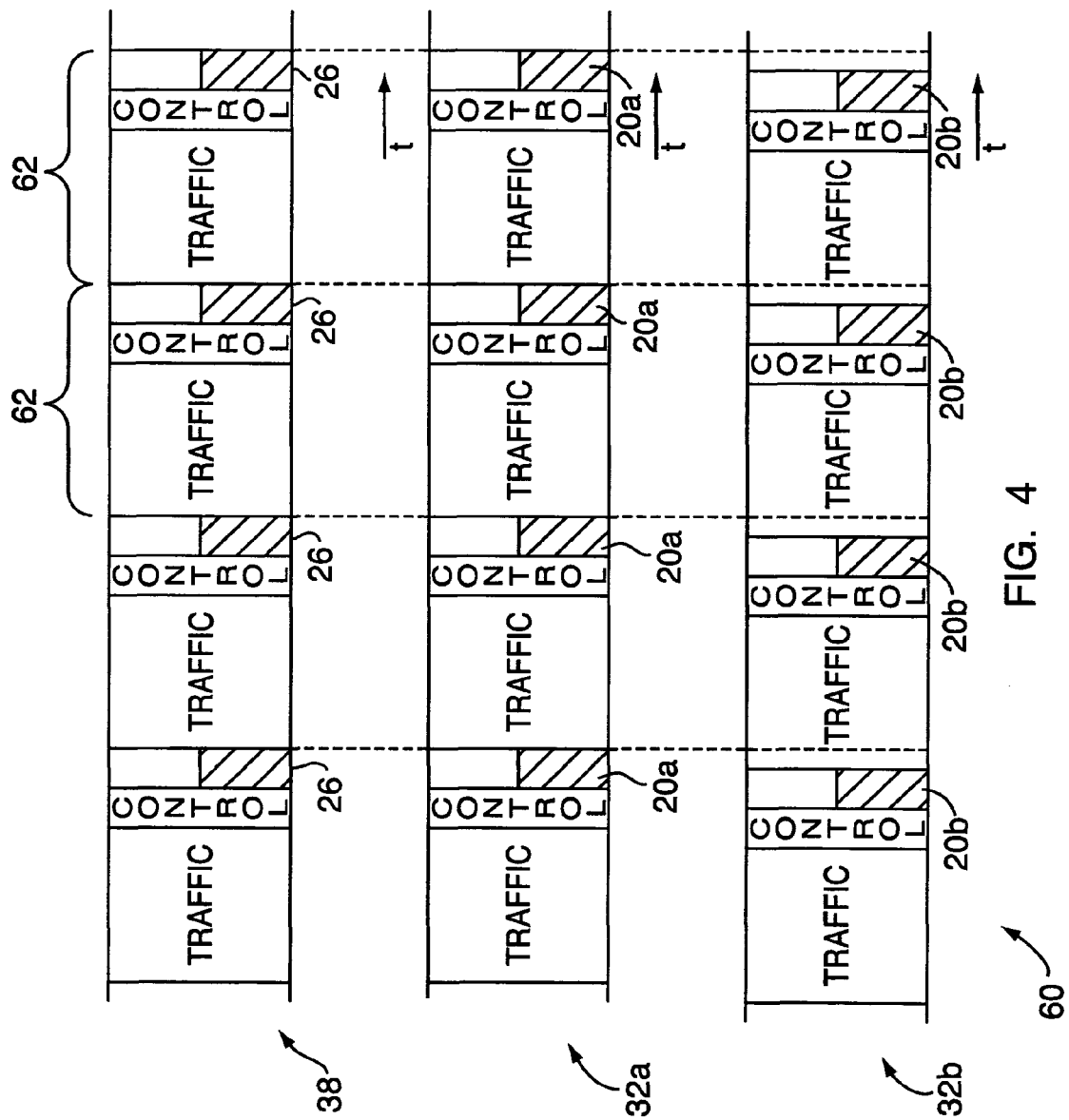
FIG. 4 is a schematic diagram of a forward link time-slotted transmission structure supporting loose backwards compatibility.

With reference to FIGS. 1-3, an embodiment of the present invention relates to a method and system for enabling the transmission of one or more secondary pilot signals 20 on the forward link 22 of a CDMA network 24 that employs a slotted transmission scheme with a time-multiplexed primary pilot signal 26. The method is backwards compatible in a "strict" sense, meaning that for existing, "legacy" mobile stations 28, the system remains unchanged; this allows service providers to add on new services incrementally, according to demand. However, for "new" or "secondary" mobile stations 30, the transmission of the secondary pilot signal(s) 20 from one or more secondary antennas 32*a*, 32*b* will allow the base station 34, aided by measurements and reports from the mobile stations 28, 30, to transmit via multiple antennas/beams, thus improving overall system performance.

The transmission of secondary pilot signals 20 on the slotted transmission scheme CDMA network 24, using the secondary antenna(s) 32*a*, 32*b*, and with strict backwards compatibility, is carried out according a time-slotted transmission structure 36 for the forward link 22, as shown in FIG. 2. The transmission structure 36 facilitates isolation between the legacy mobile stations 28 and the new mobile stations 30 on the forward link 22. The secondary pilot signal(s) 20 are transmitted as part of the time-slotted transmission structure 36, according to various schemes as discussed in more detail below.

As used herein, a "new" or "secondary" mobile station is a mobile station, e.g., mobile phone, that is aware of the presence of the secondary pilot channel 20, and that can take advantage of multiple antenna transmissions from the base station 34. A "legacy" mobile station is a mobile station that is compatible with a single, primary pilot signal 26, according to single-antenna CDMA communications or the like. Additionally, as used herein, the designations of "primary antenna" and "secondary antenna" are semantic only—the designation can be arbitrary and may change with every transmission. This is also true when several (i.e., more than two) antennas are utilized.

As noted above, existing slotted transmission scheme CDMA networks use a single base station antenna for transmissions between the base station and legacy mobile stations 28, with the forward link being divided into time slots. Each time slot is divided into portions over which the primary pilot signal, control information, and user data is transmitted in non-overlapping time zones, respectively. The condition of strict backwards compatibility requires that the legacy mobile stations 28, which are only compatible with the standard forward link slotted structure, are not disturbed in any way by the transmission of the secondary pilot channel(s) 20. Specifically, for strict backwards compatibility, since the legacy mobile stations 28 make measurements on the primary pilot channel 26, no secondary channel transmissions, e.g., transmissions of the secondary pilot signals 20, should occur during the time the primary pilot channel 26 is transmitted. Additionally, when transmitting user data intended for the legacy mobile stations 28, no secondary channel transmissions should occur.

FIG. 2 shows the forward link time-slotted transmission structure 36, according to an embodiment of the present invention supporting strict backwards compatibility. The time-slotted transmission structure 36 allows for isolation between the legacy mobile stations 28 and new mobile stations 30, and supports strict backwards compatibility. As indicated, forward link transmissions from a primary antenna 38 are divided into time slots 40a, 40b, 40c, 40d, etc., in a manner such as described above with respect to transmissions to legacy systems. In particular, each time slot 40a-40d may include the primary pilot channel 26, a control channel 42, and various traffic channels 44, which are formatted/structured according to whatever protocol is in place for communications between the base station 34 and legacy mobile stations 28. (The time slots 40a-40d shown in FIG. 2 are for illustration purposes only, and their structure/timing may differ in practice.) The forward link time slots 40a-40d are divided into two categories. A certain fraction are designated as "legacy" slots, e.g., time slots 40a, 40c. In the legacy time slots 40a, 40c, forward link transmissions are only made from the primary antenna 38. The secondary pilot channels 20, as well as signals from any other antennas/beams 32a, 32b, are not transmitted.

The remaining, non-legacy time slots are designated as "new" or "secondary" slots, e.g., time slots 40b, 40d. During these time slots, the primary pilot signal 26 is transmitted from the primary antenna 38 as set forth above, and the secondary pilot channels 20 are transmitted from the secondary antennas/beam 32a, 32b. Through appropriate signaling, the new mobile stations 30 are made aware of the positions of the legacy time slots 40a, 40c and new time slots 40b, 40d in the overall time-slotted forward link transmission structure 36.

Although FIG. 2 shows one legacy time slot for every new time slot, the actual proportion will depend in part on the number of legacy mobile stations and new mobile stations in the network 24. It will also depend on the network's other characteristics, e.g., forward link bandwidth and equipment used, and the protocols/standards in place on the network for communications.

For supporting strict backwards compatibility, the transmission mode of the secondary pilot channel(s) 20 is as follows. As described above, the secondary pilot channel 20 is only transmitted in the new time slots 40b, 40d from the secondary antenna 32a, 32b, i.e., the antenna from which the primary pilot channel 26 is not transmitted. To avoid disturbing the reception of the primary pilot channel 26 by the legacy mobile stations 28 during the new time slots 40b, 40d, the secondary pilot channel 20 is transmitted, from the secondary antenna/beams 32a, 32b, during a portion of the new time slot different from that over which the primary pilot channel 26 is transmitted. For example, the secondary pilot signal 20 may be code multiplexed during a traffic time portion, or it may be time slotted in the portion of time slots set aside for data traffic transmission to the new mobiles 30. This meets the first strict backwards compatibility constraint described above, wherein secondary channel transmissions are prohibited during the time the primary pilot channel is transmitted. Additionally, no user data 44 meant for the legacy mobiles 28 is transmitted during the new time slots 40b, 40d. As such, and since the secondary pilot 20 is transmitted only in the new time slots 40b, 40d, the second strict backwards compatibility criteria is also met, namely, no secondary channel transmissions are made while transmitting user data intended for the legacy mobile stations 28.

In some situations where the time slots 40a-40d include transmissions of control signals 42 for use by the legacy mobile stations 28, it may be necessary to ensure that the legacy mobile stations 28 receive the control signals 42 undisturbed. To do so, the secondary pilot channel 20 is transmitted, from the secondary antennas/beam 32a, 32b, during a portion of the new time slots 40b, 40d different from that over which both the primary pilot channel 26 and the control signals 42 are transmitted.

The data 50 meant for the new mobile stations 30 may be transmitted during the new time slots 40b, 40d and not during the legacy time slots 40a, 40c, although this may vary in practice. Also, while FIG. 2 indicates that the data 50 for the new mobile stations is transmitted over the primary antenna 38, it may be instead transmitted from the secondary antennas 32a, 32b, or both. (Again, as noted above, "secondary" and "primary" are designations only, as the base station 34 may initiate the various transmissions from any of the antennas 32a, 32b, 38 depending on channel conditions, etc.)

The above-described communications method is further illustrated in FIG. 3. At Step 100, forward link transmissions are divided into two categories of non-overlapping time slots, the legacy time slots 40a, 40c and the new or secondary time slots 40b, 40d. At Step 102, in the legacy slots, the base station 34 only transmits the primary channel, including the primary pilot signal 26, over the primary antenna 38. The secondary antennas 32a, 32b are not used. In the new time slots 40b, 40d, at Step 104, the base station transmits the primary pilot signal/channel 26 over the primary antenna 38, and the secondary pilot signal/channel 20 over the secondary antenna(s) 32a, 32b, but at a different time from when the primary pilot signal 26 is transmitted. Also, as indicated at Step 106, during the new time slots 40b, 40d the base station 34 does not transmit user data intended for the legacy mobile stations.

As should be appreciated, communications between the base station 34 and mobile stations 28, 30 are carried out according to one or more existing schemes implemented within the context of the present invention. Thus, communications between the base station and legacy mobile stations will be carried out "as usual" in, e.g., a slotted transmission scheme CDMA network, but in a time divided manner as described above. Additionally, although transmissions between the base station and new mobile stations will be within the context of the time constraints given above, e.g., transmitting the secondary pilot signal only during the new time slots and at a different time from when the primary pilot signal is transmitted, the communications may be according to a number of different schemes within the time constraints. For example, as mentioned, selection transmit diversity, transmit diversity, closed-loop transmit diversity, etc., all may be used.

With reference to FIGS. 1, 4, and 5, an additional embodiment of the present invention relates to a method and system for enabling the transmission of one or more secondary pilot signals 20 on the forward link 22 of a CDMA network 24 that employs a slotted transmission scheme with a time-multiplexed primary pilot signal 26, wherein the primary and secondary pilot signals are transmitted in a time-overlapping manner. This method is loosely backwards compatible, meaning that for the legacy mobile stations 28, the secondary pilot channel(s) 20 does not have a significant adverse impact on the legacy mobile stations' ability to receive and make measurements on the primary pilot channel 26.

The time slot structure 60 of the forward link, shown in FIG. 4, is kept generally the same as that of the legacy forward link. User data meant for either the legacy mobile stations 28 or the new mobile stations 30 may be transmitted in a time slot 62. In each of the time slots 62, the transmission resources that were allocated solely to the primary pilot channel 26 in the legacy system are now split or re-allocated between the primary and secondary pilot channels 26, 20, respectively, as shown graphically in FIG. 4. (By "transmission resources," it is meant transmission power, transmission codes, and the like.) Also, the secondary pilot channel(s) 20 is transmitted from the secondary antenna(s) 32a, 32b so as to overlap wholly or partially in time with respect to the primary pilot channel 26. This is shown in FIG. 4, where the secondary pilot channel/signal 20a transmitted from the secondary antenna 32a wholly time overlaps the primary pilot channel 26, while the secondary pilot channel/signal 20b transmitted from the secondary antenna 32b partially time overlaps the primary pilot channel. However, while reduced, the transmission resources for the primary pilot signal/channel 26 are maintained at or above a level that enables the mobile stations 28, 30 to receive the primary pilot channel and make signal quality measurements on it. The new mobile stations 30, being aware of the presence of the secondary pilot channel(s) 20 and of the reduction in transmit resources of the primary pilot channel, may process these pilot signals accordingly.

The time slot structure 60 shown in FIG. 4 is for illustrative purposes only, and may vary in practice. For example, while FIG. 4 shows a secondary pilot channel 20a transmitted from the secondary antenna 32a, and another secondary pilot channel 20b transmitted from the secondary antenna 32b, it may be the case that only one of the two is transmitted at any one time, or that the two transmit in concert to form a transmit beam. Also, data traffic, control signals, etc. may not necessarily be transmitted from each antenna 38, 32a, 32b during each time slot 62.

From the viewpoint of the legacy mobile stations 28, the presence of the secondary pilot channel 20 leads to a reduction in the signal quality on the primary pilot channel 26. Although this has certain consequences, the base station 34 may be tuned, with respect to the ratio of resource allocation to the primary and secondary pilot channels, to ensure that the legacy mobile stations 28 are not significantly adversely affected.

For example, if a legacy mobile station 28 is able to acquire the primary pilot channel 26 correctly, it will report CQI values that, other things being the same, will be lower in the new system than in a legacy system, i.e., because some of the transmission resources for the primary pilot channel have been reallocated for use with the secondary pilot channels. The decisions taken by the base station 34 with respect to transmissions to the legacy mobile stations 28 (e.g., transmissions rate to be used) will be more conservative, other things being equal, in the new system as compared to the legacy system.

Also, if a legacy mobile station 28 makes errors in primary pilot channel measurements due to the weakness of the primary pilot channel 26, the CQI to the base station 34 will be incorrect. As a result, the base station 34 may then allocate resources to the legacy mobile station 28 based on the incorrect CQI, which may be an over-allocation with respect to the real CQI. For example, if the CQI indicates a higher quality channel than is actually the case, the base station may try to transmit data to the legacy mobile station at a greater rate than the legacy mobile station is capable of handing considering the actual channel conditions. However, in such a case, the base station will receive other feedback from the legacy mobile station (e.g., feedback about whether or not data packets intended for the legacy mobiles were successfully decoded) that may be used to determine the reliability of the CQI feedback itself. The base station may simply compensate for the unreliable CQI by utilizing a conservative resource allocation to that particular legacy mobile, e.g., transmitting data to the legacy mobile station at a lower rate. Such a scheme, wherein the base station estimates the reliability of the CQI and takes conservative corrective action by appropriately adjusting transmission resources, is referred to as a "CQI-outer loop," and may be utilized as part of the system 24 to prevent a significant negative impact on the legacy mobile stations.

The communications method exhibiting "loose" backwards compatibility is illustrated in FIG. 5. There, as indicated, in Step 110 the base station's allocated pilot signal transmission resources are split or re-allocated for use in transmitting the primary and secondary pilot signals, i.e., each is given a share or portion of the original transmission resources. Then, in Step 112, the primary and secondary pilot signals are transmitted according to the split transmission resources. At Step 114, the base station optionally receives CQI feedback from one or more of the mobile stations for use in determining, in part, how to split or re-allocate the transmission resources.

Since certain changes may be made in the above-described method for enabling use of secondary pilot signals across a forward link of a CDMA system employing a slotted transmission scheme and time multiplexed pilot channel, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method for communication with a plurality of mobile stations using at least a first and a second transmit antenna at a base station, wherein transmissions to the plurality of mobile stations are divided into time slots, said method comprising:

during a first category of said time slots, transmitting signals from the first antenna only; and during a second category of said time slots, transmitting a primary pilot signal from the first antenna and a secondary pilot signal from the second antenna at different times within time slots of said second category of said time slots, wherein the primary and secondary pilot signals are usable by the mobile stations for signal quality and channel estimation measurements that are reported back to the base station; and wherein the primary and secondary pilot signals are transmitted over a forward link of a CDMA network, said forward link being divided into the time slots based on, at least in part, the signal quality and channel estimation measurements.

2. The method of claim 1 wherein the primary pilot signal is transmitted from the first antenna during at least a portion of each of the first category of time slots.

3. The method of claim 2 wherein user data intended for a first subgroup of said plurality of mobile stations is transmitted only during the first category of time slots from the first antenna.

4. The method of claim 3 wherein the secondary pilot signal is code multiplexed during a traffic time portion of the second category of time slots.

5. The method of claim 3 wherein the secondary pilot signal is time slotted in a portion of each of the second category of time slots designated for transmitting data to a second subgroup of said plurality of mobile stations.

6. The method of claim 2 wherein the first and second categories of time slots are non-overlapping in time.

7. A method for communication with a plurality of mobile stations using a secondary pilot signal, wherein transmissions to the plurality of mobile stations are divided into a plurality of time slots, said method comprising:

during each of a legacy subgroup of said time slots, transmitting signals only from a first antenna of a base station; and during each of a secondary subgroup of said time slots, transmitting a primary pilot signal from the first antenna and the secondary pilot signal from a second antenna of the base station at different times within time slots of said secondary subgroup of said time slots;

wherein the primary and secondary pilot signals are usable by the mobile stations for signal quality and channel estimation measurements that are reported back to the base station; and wherein the primary and secondary pilot signals are transmitted over a forward link of a CDMA network, said forward link being divided into the time slots based on, at least in part, the signal quality and channel estimation measurements.

8. The method of claim 7 wherein the primary pilot signal is transmitted from the first antenna during at least a portion of each of the legacy time slots.

9. The method of claim 8 wherein the legacy time slots are non-overlapping in time with the secondary time slots.

10. The method of claim 8 wherein user data intended for a first type of said plurality of mobile stations is transmitted during the legacy time slots only.

11. The method of claim 8 wherein user data intended for a first type of said plurality of mobile stations is not transmitted during any of the secondary time slots.

12. The method of claim 11 wherein the secondary pilot signal is time slotted in a portion of each of the secondary time slots designated for transmitting data to a second type of said plurality of mobile stations.

13. The method of claim 8 wherein the secondary pilot signal is code multiplexed during a traffic time portion of each of the secondary time slots.

14. A method for communicating between a plurality of mobile stations and a base station having primary and secondary antennas and allocated pilot signal transmission resources, wherein the method comprises:

splitting the pilot signal transmission resources into at least a first and a second share based on, at least in part, feedback received from one or more of the mobile stations;

transmitting a primary pilot signal from the primary antenna according to the first share; and transmitting a secondary pilot signal from the secondary antenna according to the second share, wherein the secondary pilot signal overlaps the primary pilot signal at least partially in time;

wherein the primary and secondary pilot signals are usable by the mobile stations for signal quality and channel estimation measurements; and wherein the primary and secondary pilot signals are transmitted over a forward link of a CDMA network.

15. The method of claim 14 wherein the first share of the pilot signal transmission resources is maintained at least at a level that enables the mobile stations to receive and measure the primary pilot signal.

16. The method of claim 15 wherein transmissions between the base station and the plurality of mobile stations across the forward link of the CDMA network are split into a plurality of time slots.

17. The method of claim 15 wherein:

the plurality of mobile stations comprises a plurality of legacy mobile stations and a plurality of secondary mobile stations, said legacy mobile stations being configured for utilizing a single pilot signal;

the primary pilot signal is for use in communications between the base station and the legacy and secondary mobile stations; and the secondary pilot signal is for use in communications between the base station and the secondary mobile stations only.

18. The method of claim 15 further comprising:

adjusting transmission resources to at least one of the mobile stations to avoid an over-allocation of transmission resources to the mobile station.

19. The method of claim 15 further comprising:

receiving at the base station channel quality indicator (CQI) feedback from one or more of the mobile stations, said CQI feedback relating to signal quality and channel estimation measurements made by the mobile stations on the primary and secondary pilot signals, wherein the pilot signal transmission resources are split into the first and second shares based on, at least in part, the CQI feedback.

20. The method of claim 15 further comprising:

receiving at the base station channel quality indicator (CQI) feedback from one or more of the mobile stations, said CQI feedback relating to signal quality and channel estimation measurements made by the mobile stations on the primary and secondary pilot signals; and estimating the reliability of the CQI feedback, wherein the pilot signal transmission resources are split into the first and second shares based on, at least in part, the estimated reliability of the CQI feedback.

* * * * *